July 19, 1960
B. I. ULINSKI
2,945,545
POWER STEERING MECHANISM
Filed April 3, 1958
2 Sheets-Sheet 1
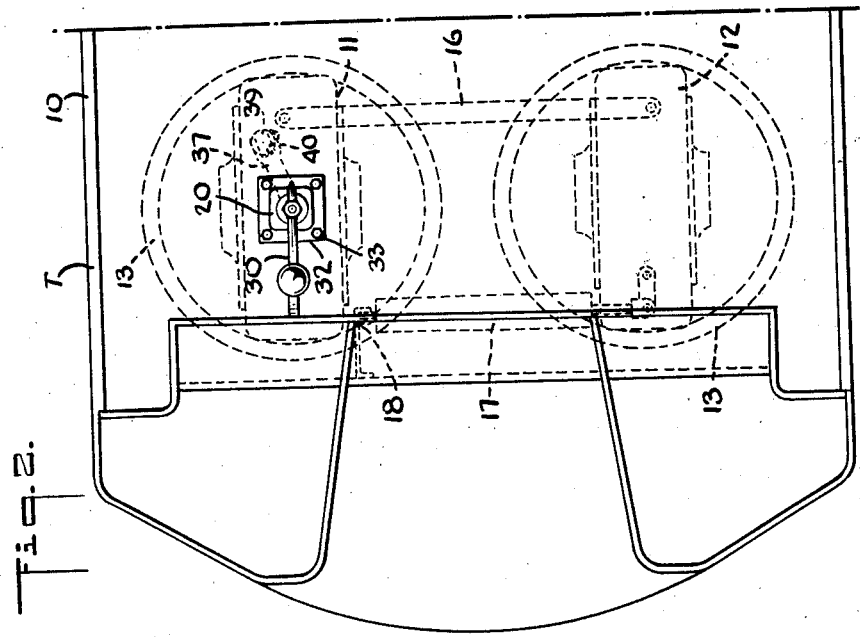
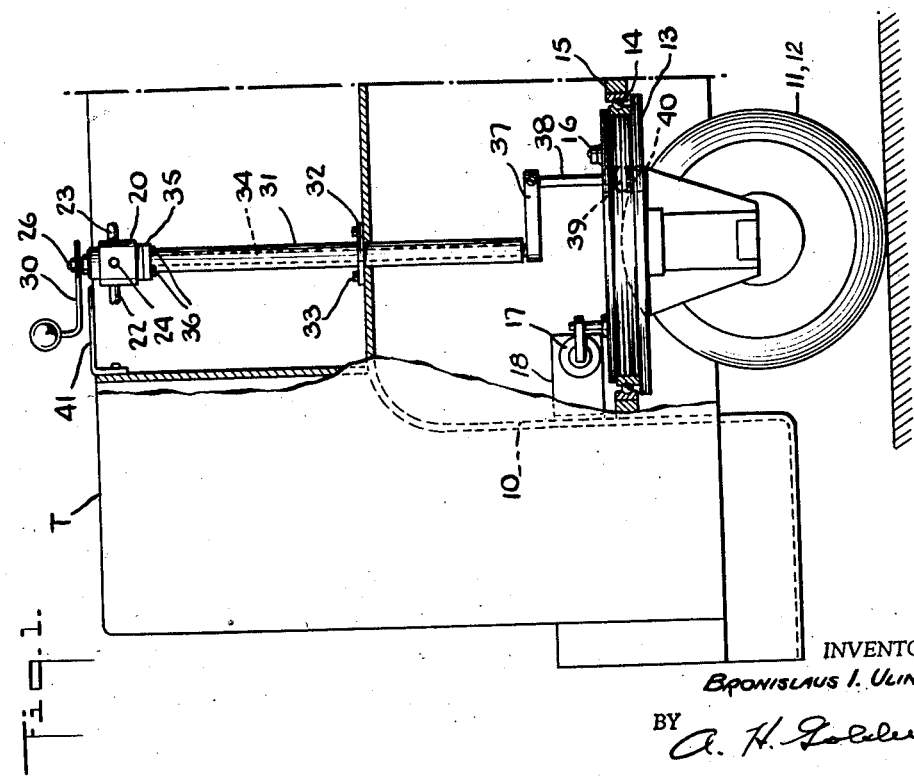
INVENTOR.
BRONISLAUS I. ULINSKI
BY
ATTORNEY

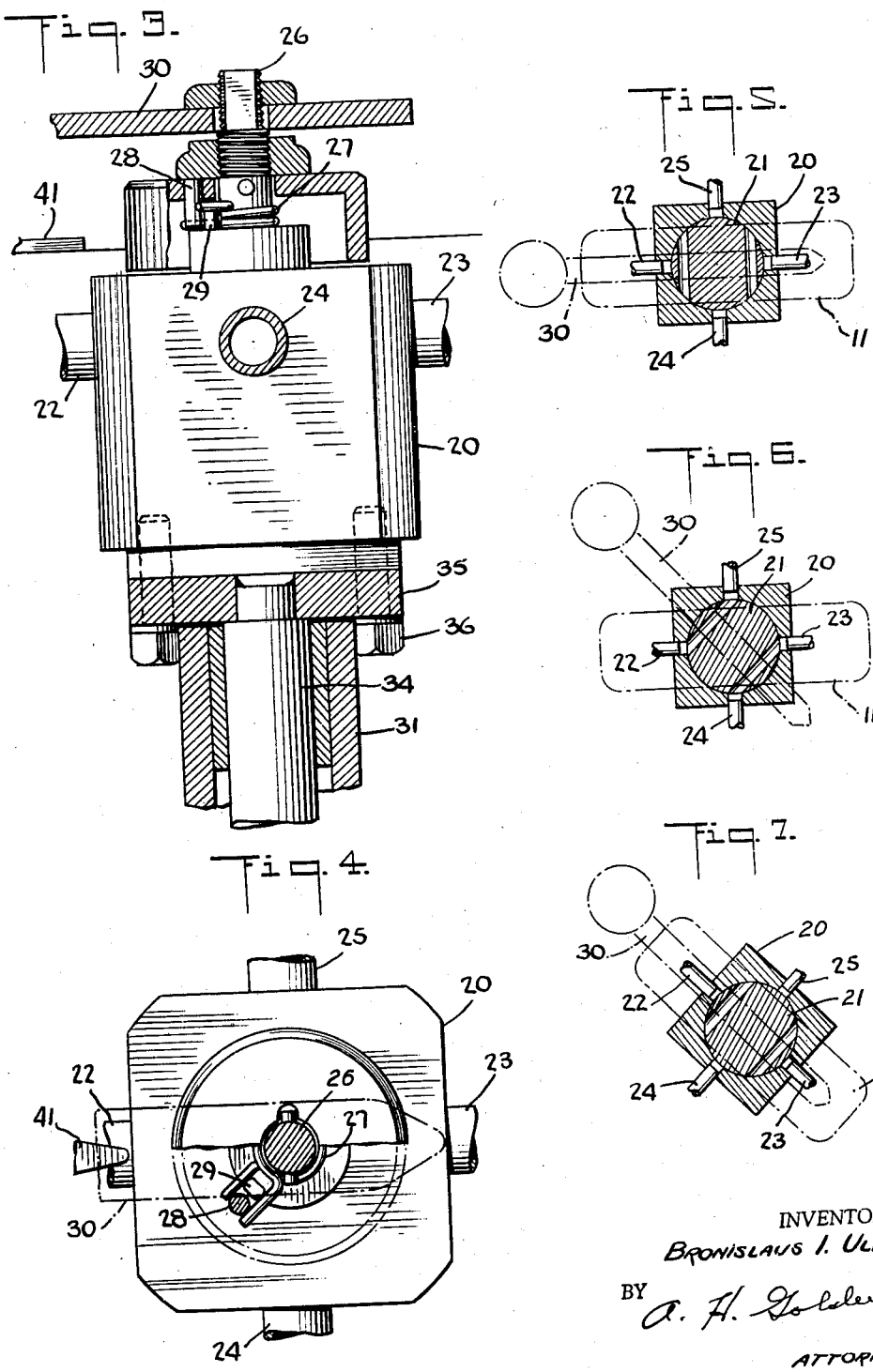

United States Patent Office 2,945,545
Patented July 19, 1960

2,945,545

POWER STEERING MECHANISM

Bronislaus I. Ulinski, Flossmoor, Ill., assignor to The Yale and Towne Manufacturing Company, Stamford, Conn., a corporation of Connecticut Filed Apr. 3, 1958, Ser. No. 726,135

2 Claims. (Cl. 180—79.2)

This invention relates to power steering mechanism for an industrial truck.

Those persons skilled in the art will appreciate that power steering mechanisms are very old in the art, and that numerous patents show power steering mechanisms of all types. It has been found, in utilizing power steering means, that many difficulties can arise through the application of power to steer the truck wheels when the wheels are against an obstruction, or in a particular position in which their movement may cause severe damage. In attempting to overcome those difficulties, it has been suggested that some indicating device be applied to the truck or other vehicle of which the power steering mechanism is a part, to indicate to the driver the positions of the steering wheels of the truck. However, such indicating devices as have been developed in the prior art are exceedingly complex, or when not complex, are so constructed that they do not actually bear a constructive relationship to the manually operated wheel or handle that controls the power steering. Further, the manually operated handle or wheel that is utilized in the prior art does not itself indicate the position of the truck wheels.

I have now conceived by my invention a power steering mechanism so constructed that the steering control means will be effective to indicate to the truck driver the steering position of the truck wheels. Where the steering control is effected through a handle that operates means in a particular housing, the housing actually will indicate by its poistion the steering position of the wheels. Moreover, the wheel position generally will be indicated by the steering handle, but with the operation or non-operation of the steering mechanism indicated to the driver by the position of the handle and housing relatively to one another.

More in detail, where the specific manual control, such as a wheel or handle, actuates control means that are carried in a control housing, that housing will be arranged to rotate as the truck wheels are steered. The steering handle will be rotated away from a neutral position relatively to the housing to effect a corresponding steering rotation of the wheels. Since the control housing rotates with the steering movement of the wheels, it will follow the steering rotation of the handle provided the wheels are not against an obstruction, thus in effect returning to neutral position relatively to the steering handle. That, actually, will indicate to the truck driver that the wheels have been steered to the position that he desires, the handle as well as the housing indicating the wheel position.

Moreover, the steering handle or wheel in my preferred construction is spring-pressed toward neutral position relatively to the control housing. Thereby, not only the position of the handle, but also its spring pressure, will indicate to the driver that the wheels have not been steered to the position called for by the handle, should that be the case.

As a further feature, I contemplate the utilization of a simple connection between the steering wheels of the truck and the housing that carries the manual control lever or handle, whereby the housing will rotate to show the position of the truck wheels. The driver will rotate the handle relatively to the housing to operate the power steering mechanism, and it will be obvious that the handle as well as the housing will indicate the wheel position when the handle is in a neutral position relatively to the housing. Therefore, it will be appreciated that the driver must have always before him a positive and continuous indication as to the positioning of the truck wheels, and in addition will have a definite indication as to whether the wheels have been steered to a position that corresponds to the particular position of the handle. That will enable the driver to avoid steering the wheels when they are against an obstruction, and in fact will inform the driver whenever the wheels for any reason do not respond to movements of the steering handle.

It is also a feature that I am able, through my exceedingly novel concept, to utilize a standard commercial control valve to achieve the very desirable operation and advantages of my invention.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawings:

Fig. 1 shows my novel power steering mechanism utilized on an industrial truck.

Fig. 2 is a plan view of the construction shown in Fig. 1.

Fig. 3 shows the control valve that I utilize in the preferred form of my invention.

Fig. 4 shows a plan view of the valve.

Figs. 5, 6, and 7 are diagrammatic views illustrating the operation of the steering control.

For the purpose of describing my novel power steering mechanism, I have chosen to show, in Figs. 1 and 2, a portion of an industrial truck T that has a main frame 10, and a pair of ground engaging wheels 11, 12 on which the truck is steered. Each of the wheels 11, 12 is supported on a wheel mounting 13 that rotates on bearings 14 relatively to a part 15 on the truck frame, whereby each wheel rotates in a particular steering axis. As is rather usual in trucks of the particular class, a hydraulic ram 17 is utilized to steer the wheels, that ram being arranged to act between a part 18 on the truck frame 10 and one wheel mounting 13. A tie rod 16 is utilized between both mountings 13 to co-ordinate the steering movements of the wheels. However, I do not wish to be limited to the particular arrangement of the ram 17 and wheels 11, 12 on the truck T, since that arrangement is shown merely by way of example and is not important to an understanding of my invention. It is merely necessary to know here that the truck T has at least one wheel such as wheel 11 that is mounted to rotate in a steering axis, with power means such as the ram 17 that is effective to rotate the wheel in that axis.

In the exceedingly novel steering mechanism that I have conceived by my invention, I utilize control means including a housing 20, Figs. 1 and 2, that I mount for movement relatively to the main frame 10 on the truck T, and in a position within the view of the truck driver. The control housing 20, in the construction that I prefer, is simply the housing of a conventional hydraulic control valve having a valve member 21, Fig. 5, that is rotated to control fluid flow between four hydraulic lines 22, 23, 24, and 25 connected to the housing 20. At least a part of each line 22, 23, 24, 25 is flexible to enable housing 20 to move relatively to the truck, as I shall describe. Those persons skilled in the art will recognize that the rotating valve member 21 will be effective to control the hydraulic ram 17 when one hydraulic line such as line 22 is connectd to a source of fluid pressure, not shown, and lines 24 and 25 are connected to opposed ends of ram 17, the line 23 then being a pressure discharge line.

The valve member 21 is equipped with the usual actuating shaft 26, best seen in Figs. 3 and 4, and a centering spring 27 that is assembled about shaft 26, spring 27 being so arranged that its opposed ends act against a pin 28 that is secured relatively to shaft 26, and against a pin 29 on the valve housing 20. Spring 27 then is effective through shaft 26 to press the valve member 21 toward neutral position relatively to the housing 20, Figs. 5 and 7. In the neutral position of valve member 21 no fluid pressure will be applied to ram 17, but spring 27 will yield so that valve member 21 can be rotated to actuate ram 17 in either direction. To enable valve member 21 to be rotated manually, a handle or lever 30 is keyed to the valve shaft 26.

I shall now particularly describe the means through which the control valve housing 20 is mounted for movement. First, when referring to Figs. 1 and 2 of the drawings, it will be seen that housing 20 is supported in the steering axis of the truck wheel 11. For the particular purpose, I show a vertical support sleeve 31 having a mounting flange 32 that is secured to the truck frame 10 through bolts 33. A shaft 34 rotates in the support sleeve 31, and has welded to its upper end a mounting plate 35, best seen in Fig. 3. Bolts 36 secure the control valve housing 20 to mounting plate 35 whereby housing 20 will rotate with shaft 34.

Therefore, it will readily be understood that the shaft 34 will support the control housing 20 while adapted to rotate that housing in the steering axis of wheel 11. Moreover, the valve member 21 and handle 30 will rotate in that same steering axis when rotating relatively to housing 20. Referring again to Fig. 1, I show the lower end of shaft 34 equipped with an arm 37 that has a rod 38 pivoted thereto. The rod 38 has an end portion 39 that is engaged in an opening 40 formed in the wheel mounting 13 of wheel 11, thus contributing a slip joint that is arranged at one side of the steering axis of wheel 11. Thus, the vertical shaft 34 and mounting 13 of wheel 11 are connected through what is in effect a universal joint whereby the valve housing 20 will rotate incidental to the steering movements of the wheel 11 while allowing some vertical or tilting adjustment of wheel mounting 13 relatively to the truck frame, should that be necessary. Because I enable wheel mounting 13 to have a movement of adjustment, my invention can be utilized on trucks of the type in which the wheels are mounted to articulate. However, wheel articulation does not actually form a part of my present invention, and I shall merely refer to the prior art for such a construction, the patent to Framhein, No. 2,713,918 being one example.

I believe that it will now be clearly understood that the control valve housing 20 will enable a truck driver very readily to know the steered position of the truck wheels 11, 12. In other words, housing 20 always will rotate incidental to the steering rotation of the wheels, thereby presenting the driver with a very clear indication of the wheel position. A part 41 on the truck frame 10, Fig. 1, may be arranged to lie in juxtaposed relation to the steering control housing 20, enabling the driver more easily to observe the exact rotated position of the housing.

In the construction that I have described, the steering handle 30, as well as the control housing 20 generally will indicate the wheel position when the truck wheels are not being steered. That will be understood when it is realized that handle 30 will then be in a neutral position relatively to housing 20, and therefore will be in the same rotated position as is the housing, when considered relatively to the truck.

To describe the operation in further detail, reference will first be made to Fig. 5 of the drawings. Fig. 5 shows diagrammatically the position of the control housing 20 that indicates the truck wheel 11 steered straight ahead. Further, in Fig. 5, the handle 30 also indicates the straight ahead wheel position since handle 30 is in neutral. If we assume now that the driver wishes to steer the truck wheel 11 to the right, he will move the handle 30 toward the position shown in Fig. 6, thus rotating the valve member 21 to apply fluid pressure to steer the wheel in that direction. When the fluid pressure actually steers the wheel 11, the steering rotation of the wheel will act through the vertical shaft 34 to rotate the housing 20. Since the fluid pressure generally will steer the truck wheel almost instantly, the housing 20 may follow very closely the manual rotation of the steering handle 30, and I have exaggerated the position shown in Fig. 6 merely for clarity. However, regardless of the speed at which the power steering takes place, the housing 20 at the completion of the steering will have moved to the position shown in Fig. 7. In that position, the handle 30 will again be in neutral relation to the housing 20, and both the handle and housing then will indicate the steered position of the truck wheels.

Of course, should the power mechanism for some reason not be effective to steer the wheels, that fact will be evident to the truck driver from the position of the control housing 20. Not only will the housing 20 indicate the actual wheel position, but that housing will at all times indicate by its position relatively to steering handle 30 whether the wheels are being effectively steered. Thus, should control housing 20 not promptly follow steering handle 30 when the handle is rotated, that fact can very easily be seen because of the constructive relation between the handle and housing. In addition, since steering handle 30 is spring pressed relatively to housing 20, the truck driver may know from the spring pressure whether the wheels are responding to the movements of the steering handle.

I believe that the operation and advantages of my extremely novel power steering mechanism will now be understood. Through my inventive concept, it is possible to indicate very clearly to the truck driver the steering position of the truck wheels, utilizing simply a part of the steering control means. Moreover, my control means will positively and efficiently indicate whether the wheels are being steered in the way that is desired by the truck driver. I accomplish these things through a construction that actually is very simple, and that may in fact utilize a standard commercial hydraulic control valve. Therefore, I believe that the very considerable value of my invention will be fully appreciated by those persons skilled in the art.

I now claim:

1. In a truck of the class described having a frame, a ground engaging wheel mounted for steering rotation relatively to the main frame of the truck, power means for rotating said wheel on its steering mounting, a control housing mounted to rotate on the truck frame, means whereby said control housing is rotated on its mounting relatively to the truck frame incidential to the steering rotation of said wheel, an indicating pointer attached to the truck frame adjacent said housing whereby to indicate relatively to said housing the steering position of the wheel, a steering handle effective when rotated relatively to a neutral position on said housing to direct power to said power means whereby to steer the truck, said handle at all times indicating by its position relatively to the control housing whether the wheel is in steering position corresponding to the particular position of the steering handle, and a spring pressing said steering handle toward neutral position relatively to said housing and yielding as said handle is rotated to steer the truck, so that the spring pressure acting through the steering handle will contribute a further indication as to whether the wheel is in steering position corresponding to the particular position of the handle.

2. In a truck of the class described having a main frame, a ground engaging wheel, means mounting said wheel for rotation about a steering axis relatively to the main frame of the truck, a hydraulic ram arranged to act relatively to the wheel mounting for rotating the mounting and wheel about said steering axis, a hydraulic valve housing, an indicating pointer attached to said main frame adjacent said housing, a valve member mounted to rotate in said housing, a steering handle on said valve member for rotating said member relatively to a neutral position on the housing whereby to apply fluid pressure to the ram to steer the truck, a spring pressing said valve member toward neutral position on said housing and yielding as said valve member is rotated to steer the truck, means mounting said valve housing for rotation on the truck frame, said means supporting the housing with its valve member in position to rotate substantially in the steering axis about which said steering wheel rotates, a shaft secured to said valve housing to rotate therewith, a portion on said shaft extending at one side of the axis in which said wheel is steered, a slip joint between said portion and the wheel mounting whereby said mounting when rotated will rotate said part and valve housing while allowing some movement of adjustment between the wheel mounting and truck frame, said valve housing by its rotation indicating at all times the steering position of the wheel, and said steering handle by its position relatively to neutral on said valve housing indicating whether the wheel is in a steering position corresponding to the particular handle position.

References Cited in the file of this patent

UNITED STATES PATENTS

| | | |
|---|---|---|
| 1,364,872 | Feightner | Jan. 11, 1921 |
| 1,897,075 | Samson | Feb. 14, 1933 |
| 2,411,119 | Stephens | Nov. 12, 1946 |
| 2,512,979 | Strother | June 27, 1950 |
| 2,796,945 | Dye et al. | June 25, 1957 |

FOREIGN PATENTS

| | | |
|---|---|---|
| 347,212 | Great Britain | Apr. 20, 1931 |